(12) United States Patent
Nahorniak

(10) Patent No.: US 12,522,429 B2
(45) Date of Patent: Jan. 13, 2026

(54) CONTAINER DOCKING DEVICE

(71) Applicant: AMP Robotics Corporation, Louisville, CO (US)

(72) Inventor: Camden Nahorniak, Aurora, CO (US)

(73) Assignee: AMP Robotics Corporation, Louisville, CO (US)

(*) Notice: Subject to any disclaimer, the term of this patent is extended or adjusted under 35 U.S.C. 154(b) by 651 days.

(21) Appl. No.: 17/877,490

(22) Filed: Jul. 29, 2022

(65) Prior Publication Data

US 2024/0034553 A1 Feb. 1, 2024

(51) Int. Cl.
*B65D 90/00* (2006.01)
(52) U.S. Cl.
CPC ................................. *B65D 90/0033* (2013.01)
(58) Field of Classification Search
CPC .................................................. B65D 90/0033
USPC ............................................................ 280/292
See application file for complete search history.

(56) References Cited

U.S. PATENT DOCUMENTS

| | | | | |
|---|---|---|---|---|
| 5,662,450 A * | 9/1997 | Roberts | .............. | B65D 90/0013 414/679 |
| 10,967,300 B2 * | 4/2021 | Droke | .................... | B01D 19/00 |
| 11,643,003 B1 * | 5/2023 | Buonerba | ............ | B65D 90/046 220/1.5 |
| 2010/0215466 A1 * | 8/2010 | Cline | .................... | B60P 1/6427 414/495 |
| 2018/0079347 A1 * | 3/2018 | Ellis | ...................... | B60P 1/6454 |

FOREIGN PATENT DOCUMENTS

| | | | | |
|---|---|---|---|---|
| EP | 2367743 B1 * | 10/2012 | ............. | B60P 1/6463 |
| EP | 4124506 A1 * | 2/2023 | ............. | B60P 1/486 |

* cited by examiner

*Primary Examiner* — Alentin Neacsu
*Assistant Examiner* — Mohamed M Medani
(74) *Attorney, Agent, or Firm* — Van Pelt, Yi & James LLP

(57) ABSTRACT

A container docking device is disclosed, including: a container connector comprising: a tension mechanism that is configured to engage a container at an attachment point, wherein a portion of the container connector conforms to an end portion of the container; and a support member that is configured to engage a bottom portion of the container to lift the container; and a towing device connector that is configured to engage a lifting unit of a towing device such that lifting force from the lifting unit is transmissible to the support member.

15 Claims, 10 Drawing Sheets

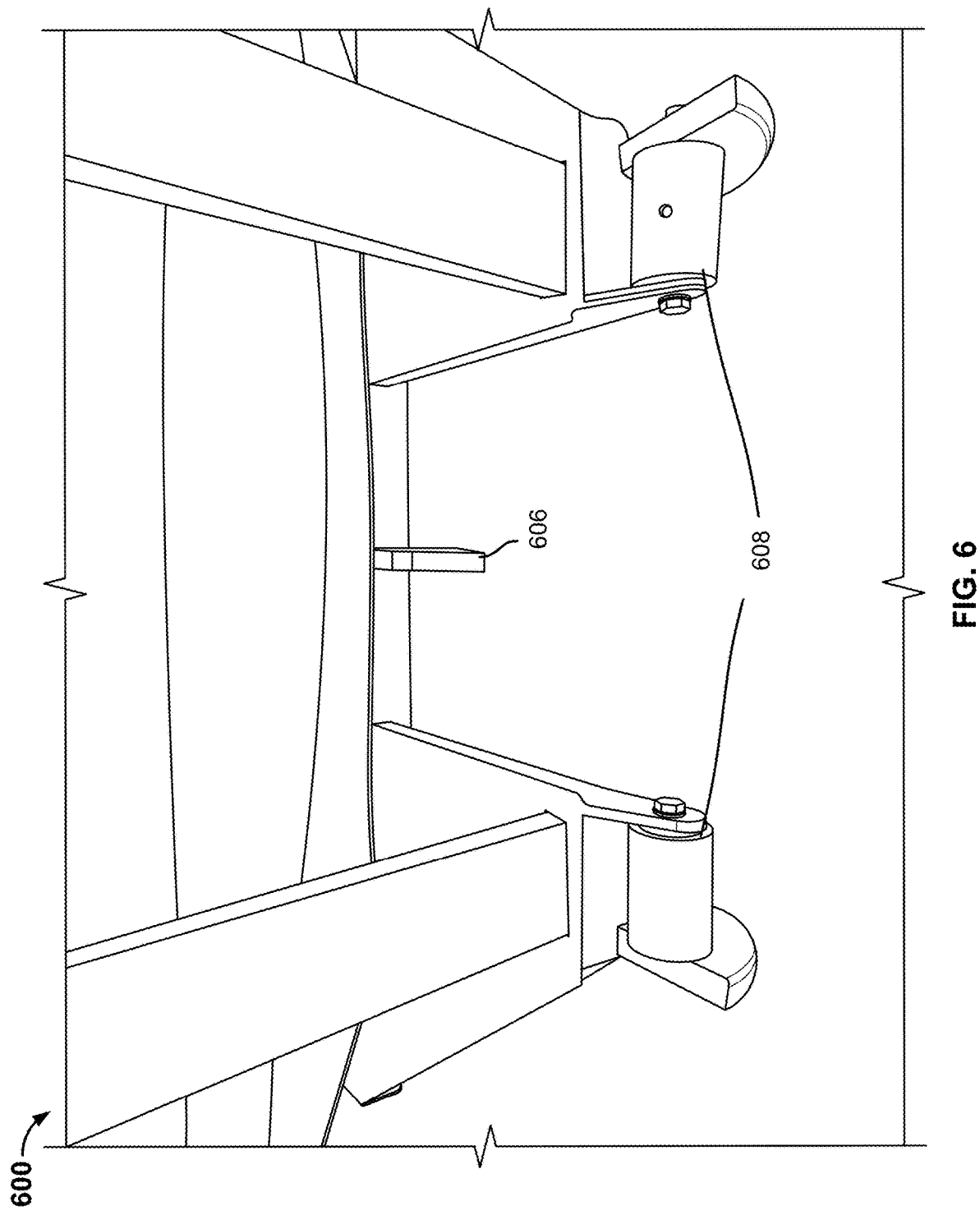

CONTAINER DOCKING DEVICE

BACKGROUND OF THE INVENTION

Commercial waste compactors with removable containers are common in the material processing industry. In a typical use case, the containers are standardized for size and/or capacity and are removed from the trash compactor once full, to be replaced by a similarly sized but empty container. Typical industrial waste containers can weigh approximately 22,000 pounds or more when full.

To move such a container without requiring a specialized ("roll off") truck, the container can be hooked up to a mechanical towing device with intrinsic lift capabilities and the towing device can tow the container on a set of its wheels. For example, the mechanical towing device can be driven by a single operator. However, in order to be connected to the mechanical towing device, the standardized waste container needs to be first modified to enable the towing device to lift the container. A typical modification to the container is to permanently add a foldable arm attachment to one end of the container, which will enable the towing device to connect to the container, lift up the container at the connected end, and drive the connected container to a new location.

However, there are a few drawbacks to engaging the container to a mechanical towing device using the added foldable arm of the container. The first is that the cost to add the foldable arm attachment is a high, especially relative to the total cost of the container. The second is that because containers are typically unloaded at offsite waste facilities, there is often a problem with getting the correct container (a standardized container that is modified to include the non-standard foldable arm attachment) back. The third is that the foldable arm attachment provides only a single point of connection between the container and the towing device and therefore provides uneven weight distribution of the container's heft over the lifting unit of the towing device.

There exists, therefore, a need for a better system to support the connection between a mechanical towing device and heavy compactor containers without requiring costly container modification.

BRIEF DESCRIPTION OF THE DRAWINGS

Various embodiments of the invention are disclosed in the following detailed description and the accompanying drawings.

FIG. 6 is a diagram showing a close-up view of the portion of the front end of a roll off container to which a container docking device is to connect.

DETAILED DESCRIPTION

Figure 1:
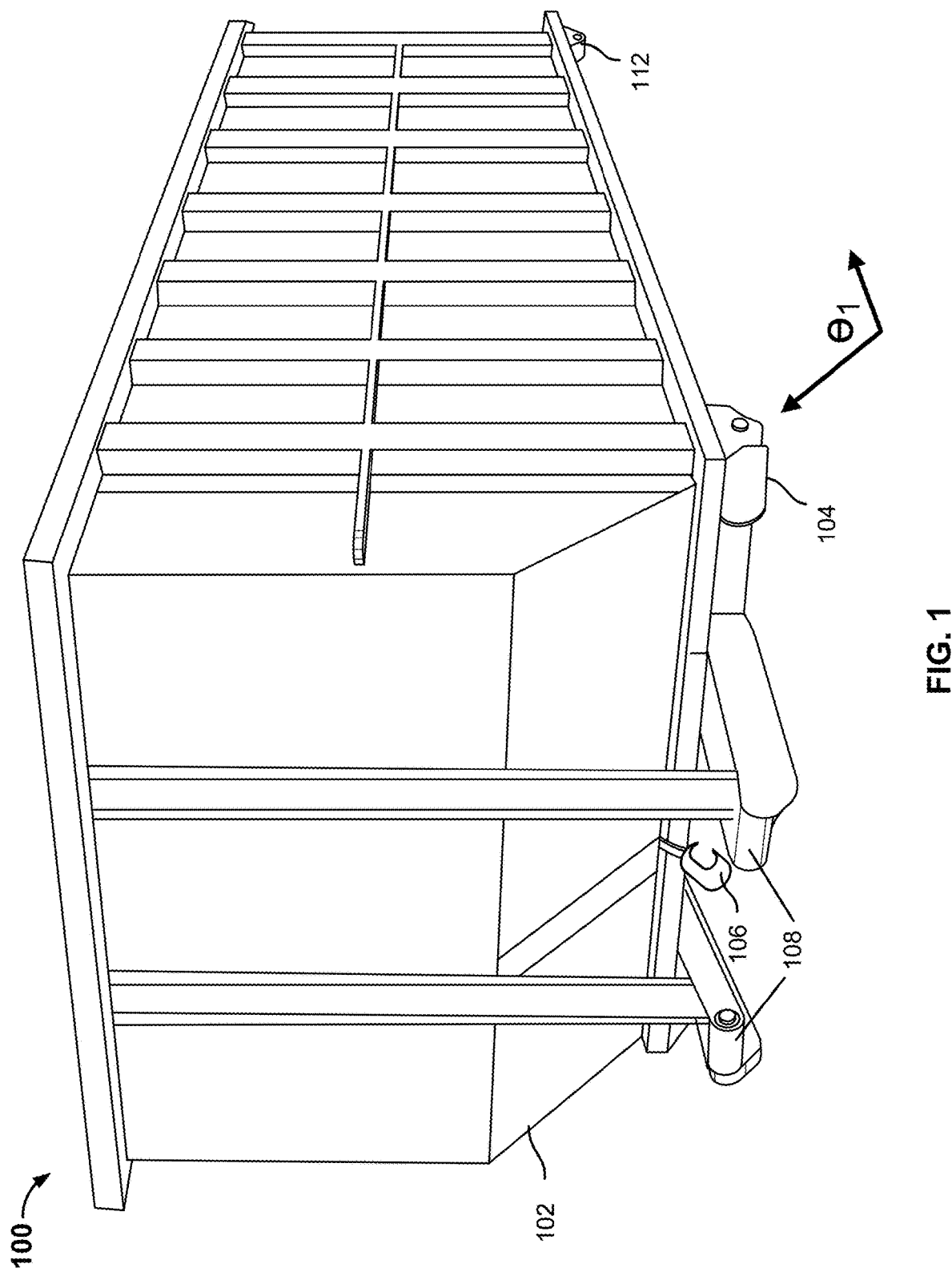
FIG. 1 is a diagram showing an example of a roll off container with a tapered end. Roll off container 100 shows an example design of a roll off container.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A waste container, which is sometimes referred to as a "roll off container," is a relatively inexpensive, reusable component for holding and transporting waste. Since roll off containers may be used across multiple brands of waste compactors, roll off containers of a similar capacity have relatively standard shapes and constructions. Typically, a roll off container (e.g., such as a forty-yard size) has front cylinders (on the same or different planes) at the front end that guide the container onto the rails of a roll off truck and also wheels (e.g., which are closest to the compactor) on the back end that can be rolled on to facilitate movement of the container, such as, in and out of the compactor dock. In some instances, a roll off container may have wheels on both ends, but this is less common. To insert and remove containers from the compactors, the front end of the container that is farther from the compactor is lifted slightly above the ground, and the container is pulled or pushed on its two back wheels. It is possible to use a forklift to insert and remove the container, but this approach often causes damage to the container over time and is therefore undesirable.

FIG. 1 is a diagram showing an example of a roll off container with a tapered end. Roll off container 100 shows an example design of a roll off container. For example, roll off container 100 can be any of size (e.g., yardage). In a specific example, roll off container 100 is a forty-yard container. FIG. 1 shows the end of roll off container 100 that is to connect with a towing device that is to lift that end of roll off container 100 off the ground and tow roll off container 100. The end of roll off container 100 that is shown in FIG. 1 is sometimes referred to as the "front end" of a container. As shown in the example of FIG. 1, lower section 102 the front end of roll off container 100 is angled/tapered towards the bottom of roll off container 100 at angle $\theta_1$ relative to the bottom of roll off container 100. Angle $\theta_1$ can be at 135°, for example. In another example, angel $\theta_1$ can be another angle that is greater than 90° but less than 180°. The front end of roll off container 100 includes hook 106, guiding rollers 108, and front cylinders 104 (only one front cylinder is shown in FIG. 1 while the other one on the other side of roll off container 100 is occluded in FIG. 1). Front cylinders 104 may or may not rotate as roll off container 100 does not usually roll on them, unlike back wheels 112, which roll off container 100 does roll on as it is being pulled onto a roll of truck or towed. Typically, to move roll off container 100 using a roll off truck, hook 106 is attached to the back of the roll off truck and roll off container 100 is pulled onto the back of the truck as guiding rollers 108 and front cylinders 104 slide along rails on the back of the truck and as roll off container 100 rolls towards the truck using back wheels 112.

As will be described in further detail below, in various embodiments, the angled front end of roll off container 100 can be tightly coupled to a towing device that has lifting capabilities using a container docking device, as disclosed herein, to enable the towing device to lift up the front end of roll off container 100 and tow it on back wheels 112.

Figure 2:
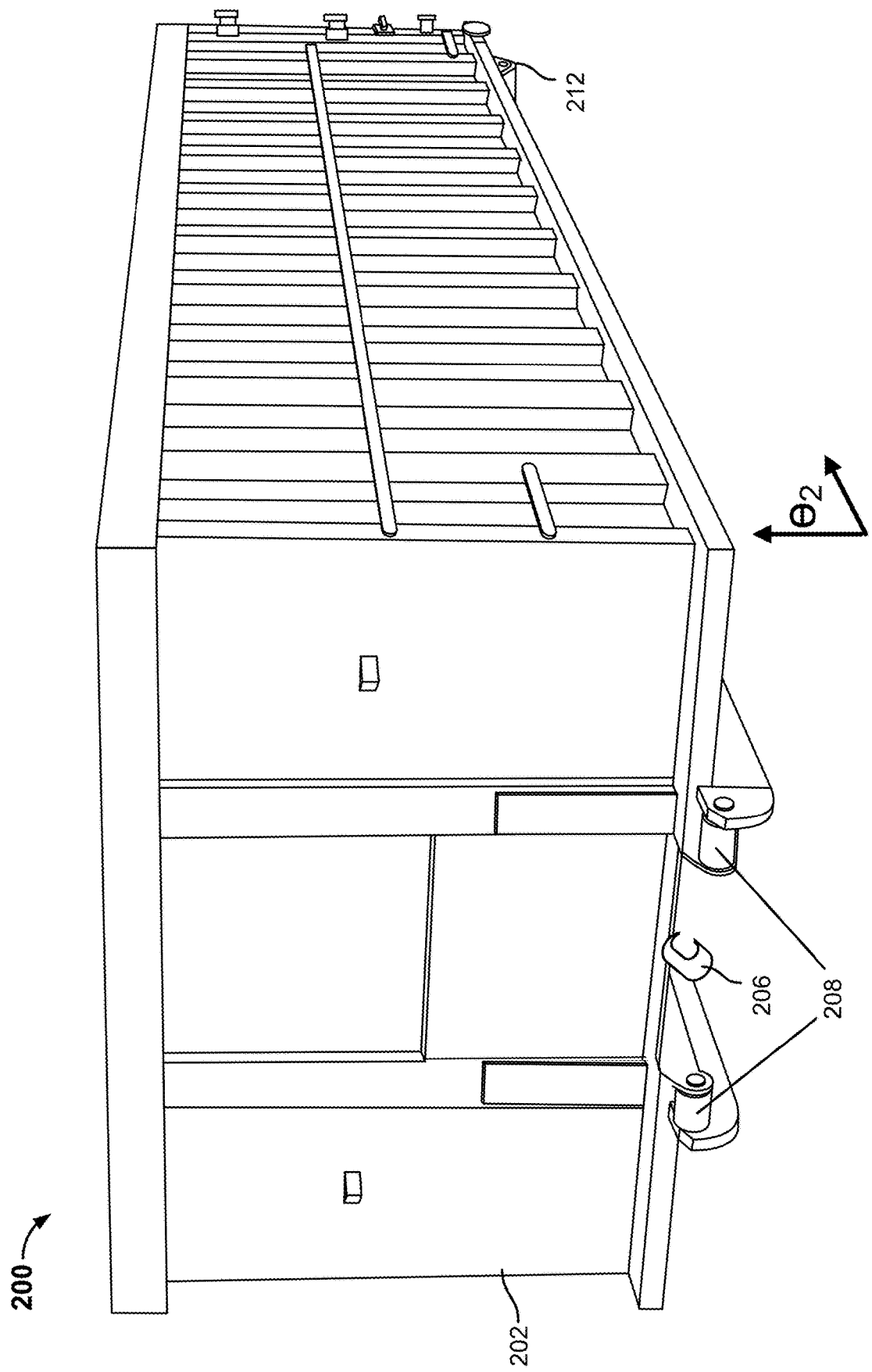
FIG. 2 is a diagram showing an example of a roll off container without a tapered end.

FIG. 2 is a diagram showing an example of a roll off container without a tapered end. Roll off container 200 is another example of a roll off container with a different shape in its end design as compared to roll off container 100 of FIG. 2. Specifically, in contrast to roll off container 100 of FIG. 1, roll off container 200 of FIG. 2 does not include an angled/tapered section at its front end. FIG. 2 shows front end 202 of roll off container 200 that is to connect with a towing device that is to lift front end 202 of roll off container 200 off the ground and tow it. As shown in the example of FIG. 2, front end 202 of roll off container 200 is substantially perpendicular to the bottom of roll off container 200. Put another way, front end 202 is at angle $\theta_2$ relative to the bottom of roll off container 200 and angle $\theta_2$ is approximately 90°. Front end 202 of roll off container 200 includes hook 206 and guiding rollers 208. Roll off container 200 can be towed on back wheels 212. Typically, to move roll off container 200 using a roll off truck, hook 206 is attached to the back of the roll off truck and roll off container 200 is pulled onto the back of the truck as guiding rollers 208 slide along rails on the back of the truck and as roll off container 200 rolls towards the truck using back wheels 212.

As will be described in further detail below, in various embodiments, front end 202 (with no taper) of roll off container 200 can be tightly coupled to a towing device that has lifting capabilities using a container docking device, as disclosed herein, to enable the towing device to lift up the front end of roll off container 200 and tow it on back wheels 212.

Figure 3:
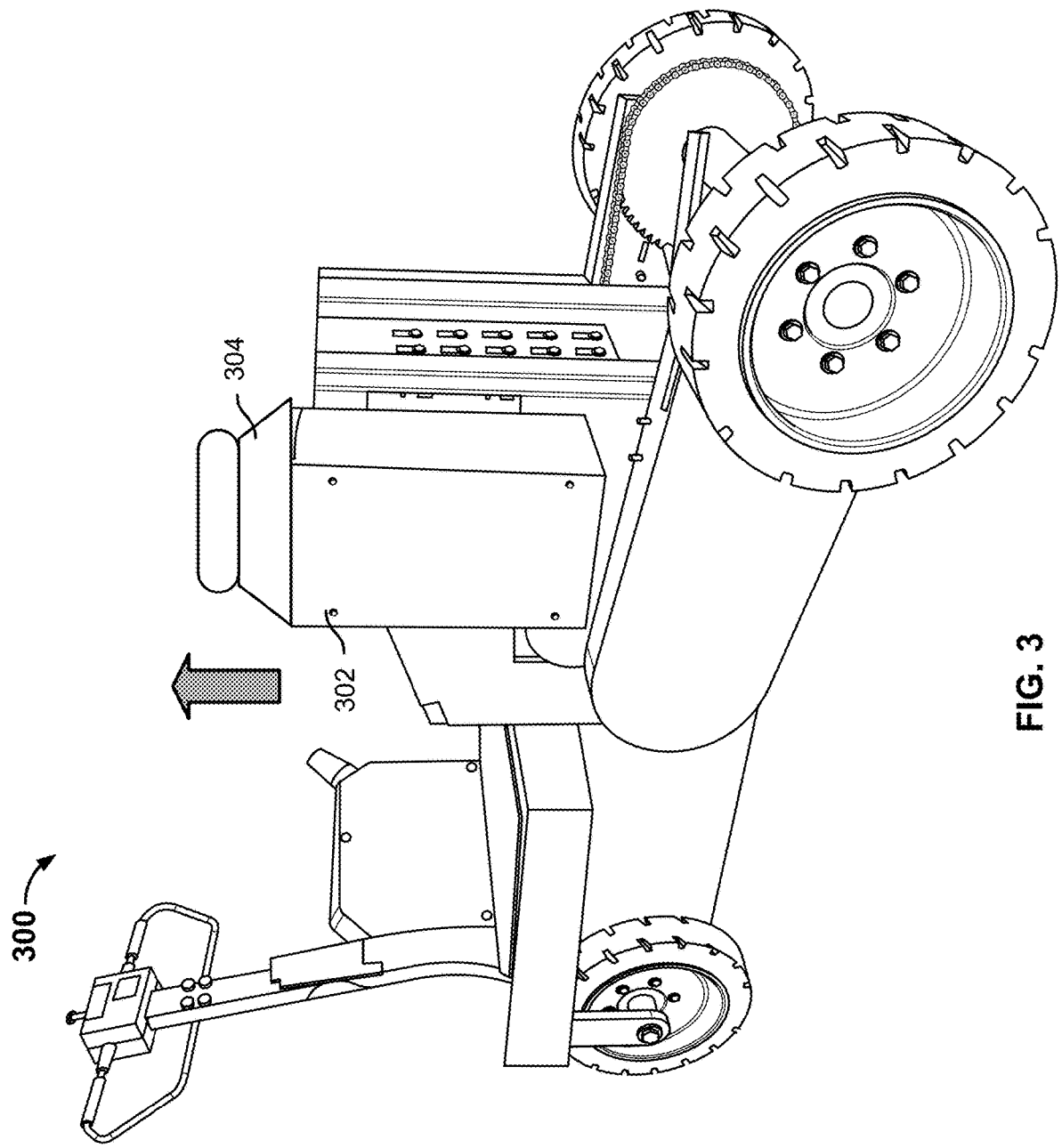
FIG. 3 is a diagram showing an example towing device.

FIG. 3 is a diagram showing an example towing device. The back of towing device 300 can be coupled to a roll off container to tow the container to a new location. Compared to a roll off truck, towing device 300 is less expensive, smaller, and easier to maneuver. As such, towing device 300 can pull a roll off container in more confined spaces that a roll off truck cannot physically or practically enter. Towing device 300 includes lifting unit 302 that is operable to push upwards to hoist/lift (e.g., up to thousands of pounds). Towing device 300 can be coupled to a roll off container (e.g., such as roll off container 100 of FIG. 1 and roll off container 200 of FIG. 2) using a container docking device, as described herein, to lift the front end of the container and pull the roll off container on its back wheels. In some embodiments, attachment 304 can be mounted to lifting unit 302 of towing device 300 to form a point of engagement with a container docking device, which then rigidly couples to the front end of a roll off container to enable a reliable connection between towing device 300 and the roll off container. In some embodiments, lifting unit 302 can be engaged to the container docking device to lift the container docking device upwards and thereby lift the front end of the roll off container off the ground, given the tight coupling between the container docking device and the front end of the container, as will be described in further detail below. Given that lifting unit 302 is located at or near the center of towing device 300, one advantage of attaching the container docking device to lifting unit 302 is to distribute the weight of the roll off container more centrally over towing device 300, which is more likely to prevent the end of towing device 300 with the front wheels and steering mechanism from lifting off the ground and therefore interfering with towing device 300's towing capabilities.

Figure 4:
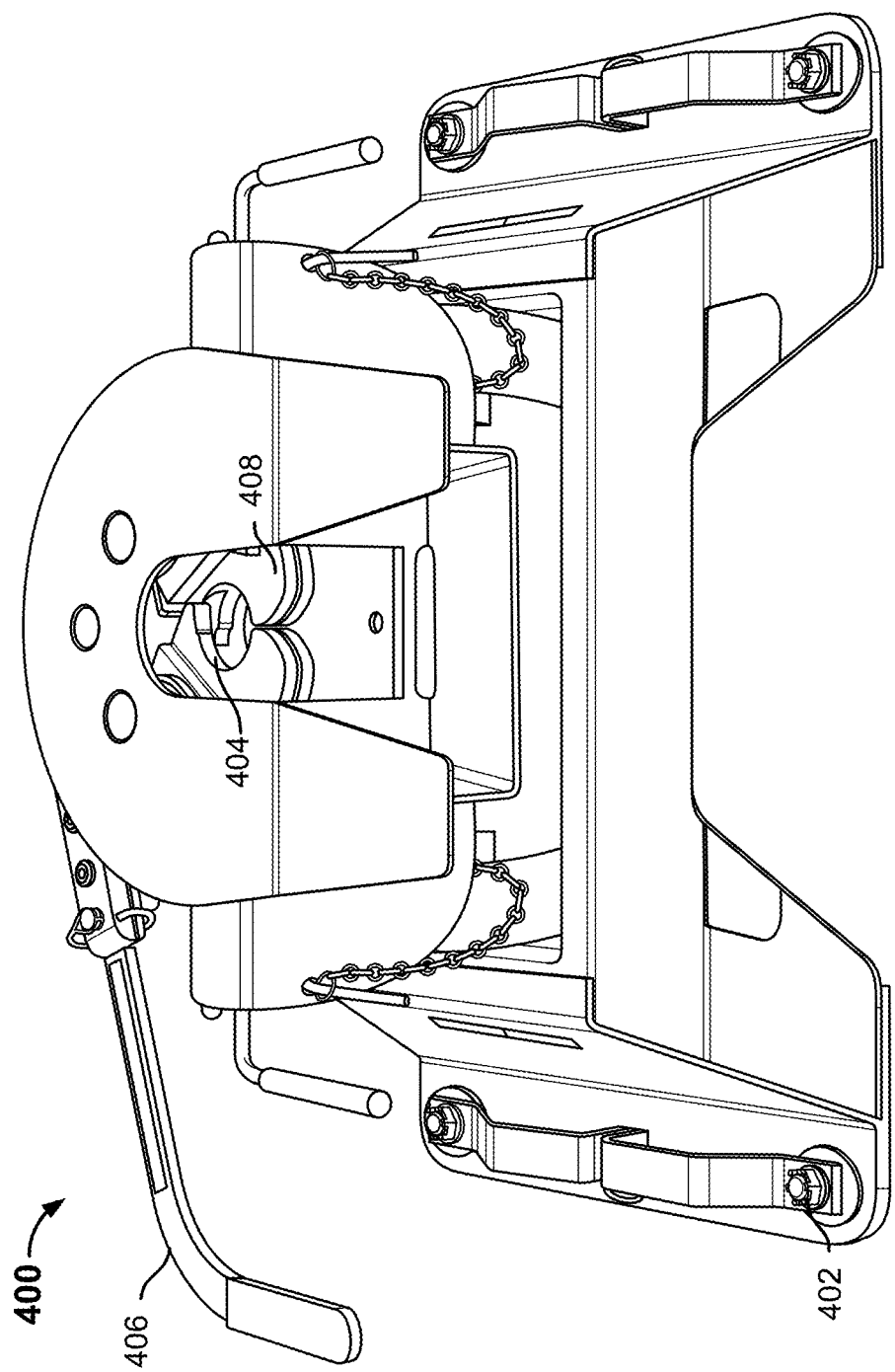
FIG. 4 is a diagram showing an example of an attachment that can be mounted or attached to the lifting unit of a towing device and used to connect to a container docking device.

FIG. 4 is a diagram showing an example of an attachment that can be mounted or attached to the lifting unit of a towing device and used to connect to a container docking device. In some embodiments, attachment 304 that is mounted on top of lifting unit 302 of towing device 300 of FIG. 3 can be implemented with attachment 400 of FIG. 4. In the example of FIG. 4, attachment 400 is a kingpin hitch. For example, attachment 400 can be secured to the lifting unit of a towing device via bolts such as bolt 402. A kingpin or other connecting device (e.g., a ball connector) that is attached to the container docking device (not shown) can be inserted into jaw mechanism 404 and then locked into place by bar 406, which will engage jaw mechanism 404 around the kingpin or other connecting device. While the kingpin of the container docking device is locked in place and therefore cannot easily decouple from attachment 400, pivoting head plate 408 will provide rotational movement, as needed, to assist the container docking device in maneuvering the container.

An alternative to using a kingpin hitch as an attachment to mount to the lifting unit of a towing device is a gooseneck hitch.

Embodiments of a container docking device are described herein. In various embodiments, a container docking device securely connects to both a towing device and a container to enable the container to be lifted at one end and to be towed using the wheels on its other end by the towing device, without any modification (e.g., addition of an arm attachment) to the container. The container docking device includes a container connector that comprises a tension mechanism that engages the container at an attachment point. In some embodiments, a lengthwise structure of the container connector is angled so as to conform to the angle of the end of the container to which it will be secured. In some embodiments, the container connector further includes a support member that slides underneath a bottom portion of the container to channel a lift force to the container. The container docking device also includes a lifting device connector that engages a lifting unit of a towing device such that force from the lifting unit is transmitted to the support member.

Figure 5A:
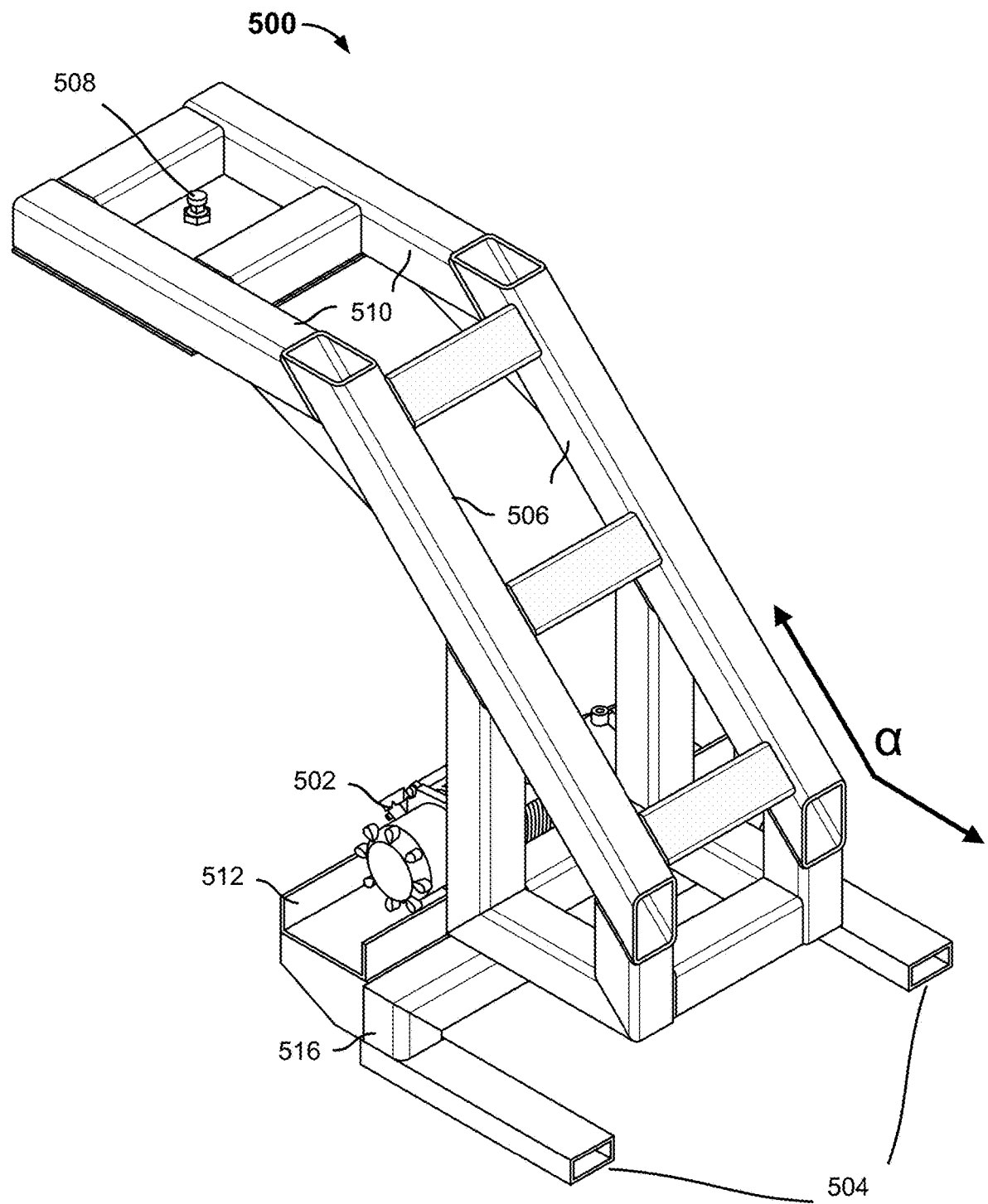
FIG. 5A is a diagram showing a first view of an example container docking device in accordance with some embodiments.

FIG. 5A is a diagram showing a first view of an example container docking device in accordance with some embodiments. Container docking device 500 is configured to connect to both the front end of a roll off container and the lifting unit of a towing device. In some embodiments, container docking device 500 can be made substantially of low-carbon steel. Container docking device 500 can connect to the front end of a roll off container using lengthwise structure 506, support member 504, and winch 502. As shown in the example of FIG. 5A, lengthwise structure 506 comprises two bars that form angle α relative to the plane formed by support member 504. In some embodiments, angle α is chosen to be substantially similar to the angle of the front end of the roll off container to which container docking device 500 is to be connected so that lengthwise structure 506 can conform snugly against that end of the container. While not shown in the example of FIG. 5A, lengthwise structure 506 can include brackets or another adjustable mechanism that would allow angle α of lengthwise structure 506 to be flexibly adjustable. For example, if container docking device 500 were to be connected to a roll off container with a tapered/angled front end (e.g., roll off container 100 of FIG. 1), then angle α would need to be set to substantially match the greater than 90° but less than 180° angle of the container's front end (e.g., such as the angle $\theta_1$ as shown in FIG. 1). In another example, if container docking device 500 were to be connected to a roll off container without a tapered/angled front end (e.g., roll off container 200 of FIG. 2), then angle α would need to be set to substantially match the approximately 90° of the container's front end (e.g., such as the angle $\theta_2$ as shown in FIG. 2). In the example of FIG. 5A, winch 502 is fastened onto tray 512 of container docking device 500. For example, winch 502 can be an electric or a hydraulic winch. For example, winch 502 can provide up to 12,000 pounds of pulling force. The end of the spool of cable from winch 502 is to attach to an attachment point (e.g., hook 106 of roll off container 100 of FIG. 1 or hook 206 of roll off container 200 of FIG. 2) on the front end of the roll off container and winch 502 is configured to pull container docking device 500 tight against the front end of the container to create tension between container docking device 500 and the container. Alternative tensions mechanisms to winch 502 that can be used in container docking device 500 include a ring and a chain, a rachet mechanism, and a come along. When winch 502 pulls the roll off container against container docking device 500, support member 504, comprising two horizontal arms on the same plane, slides underneath guiding rollers (e.g., guiding rollers 108 of roll off container 100 of FIG. 1 or guiding rollers 208 of roll off container 200 of FIG. 2) of a roll off container. The guiding rollers of the roll off container slide up the arms of support member 504 and butt up against vertical piece 516, which provides the effect of locking the guiding rollers into place (if they had rotating capabilities). For example, the horizontal arms of support member 504 can be approximately 34-36 inches apart to match the same (e.g., standardized) distance between the guiding rollers of the front end of a roll off container. While not shown in the example of FIG. 5A, the distance between horizontal arms of support member 504 can be adjustable using a mechanism that permits extension of the location of each horizontal arm along vertical piece 516 so that the distance between horizontal arms can be flexibly changed to match the actual distance between the guiding rollers of the roll off container to which container docking device 500 is to be coupled.

Figure 5B:
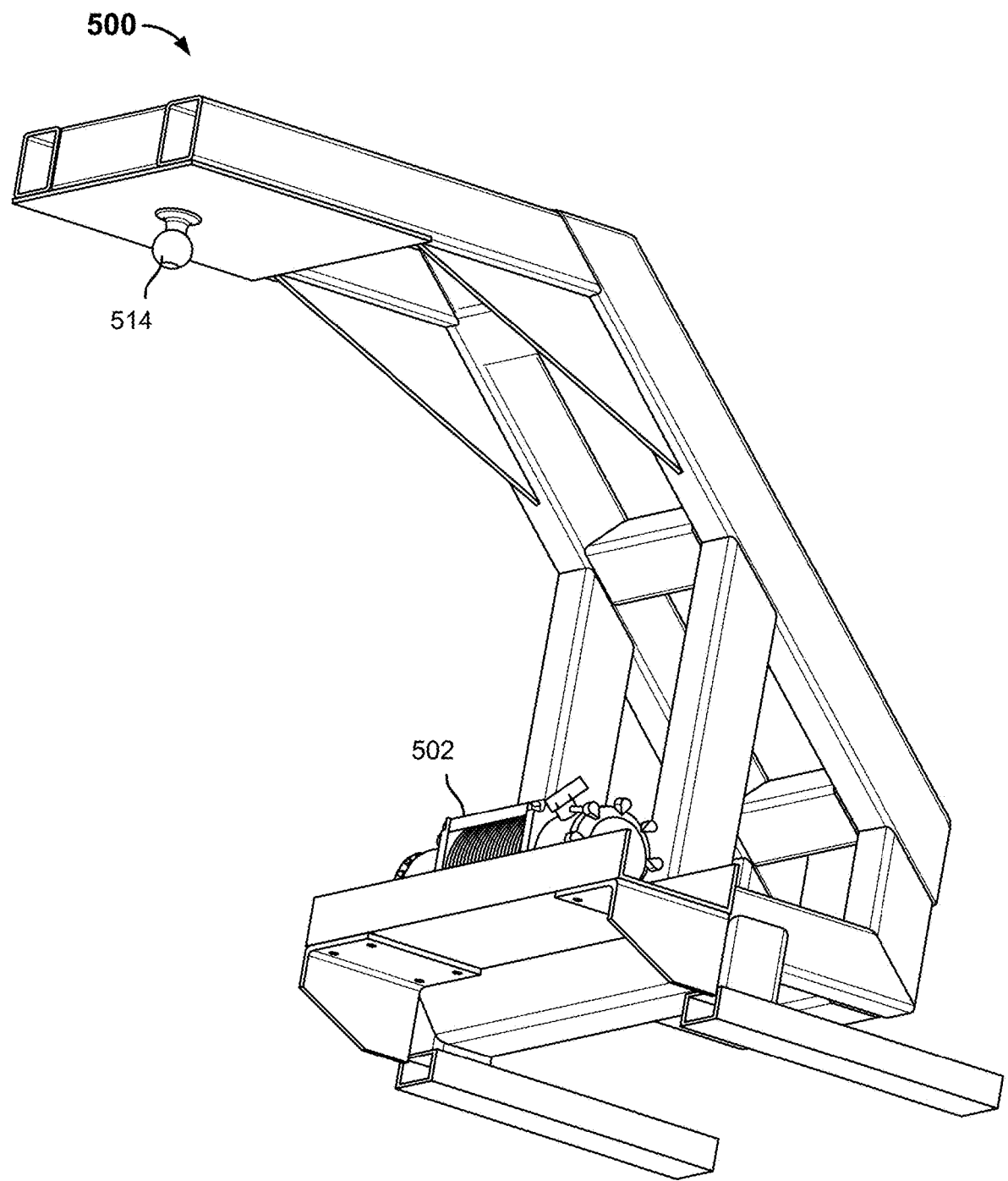
FIG. 5B is a diagram showing a second view of an example container docking device in accordance with some embodiments.

FIG. 5B is a diagram showing a second view of an example container docking device in accordance with some embodiments. Container docking device 500 can connect to the lifting unit of a towing device (e.g., such as lifting unit 302 of towing device 300 of FIG. 3) using extension 510 and kingpin 514, which is fastened to extension 510 via fastener 508 (as shown in FIG. 5A). For example, kingpin 514 of container docking device 500 is slotted into a corresponding hitch (e.g., the kingpin hitch of FIG. 4) that is mounted to the lifting unit of the towing device (e.g., towing device 300 of FIG. 3) and then locked into the hitch of the towing device so that container docking device 500 and the towing device are securely coupled with room for rotational but not translational movement. Kingpin 514 is only an example tool to engage extension 510 of container docking device 500 to the lifting unit of the towing device and other types of lifting unit connectors can be used in actual implementation.

The result of using winch 502 to pull the container tightly against container docking device 500 and also connecting kingpin 514 to the lifting unit of the towing device is that activation of the towing device's hydraulic hoist then lifts the attached, front end of the container off of the ground, allowing it to be rolled free on its back wheels (e.g., back wheels 112 of roll off container 100 of FIG. 1 or back wheels 212 of roll off container 200 of FIG. 2).

FIG. 6 is a diagram showing a close-up view of the portion of the front end of a roll off container to which a container docking device is to connect. Specifically, FIG. 6 shows hook 606 (e.g., hook 106 of roll off container 100 of FIG. 1 or hook 206 of roll off container 200 of FIG. 2) to which the cable of the winch of the container docking device is to engage and guiding rollers (e.g., guiding rollers 108 of roll off container 100 of FIG. 1 or guiding rollers 208 of roll off container 200 of FIG. 2), which are to slide onto the support member of the container docking device and butt up against a portion of the container docking device.

Figure 7:
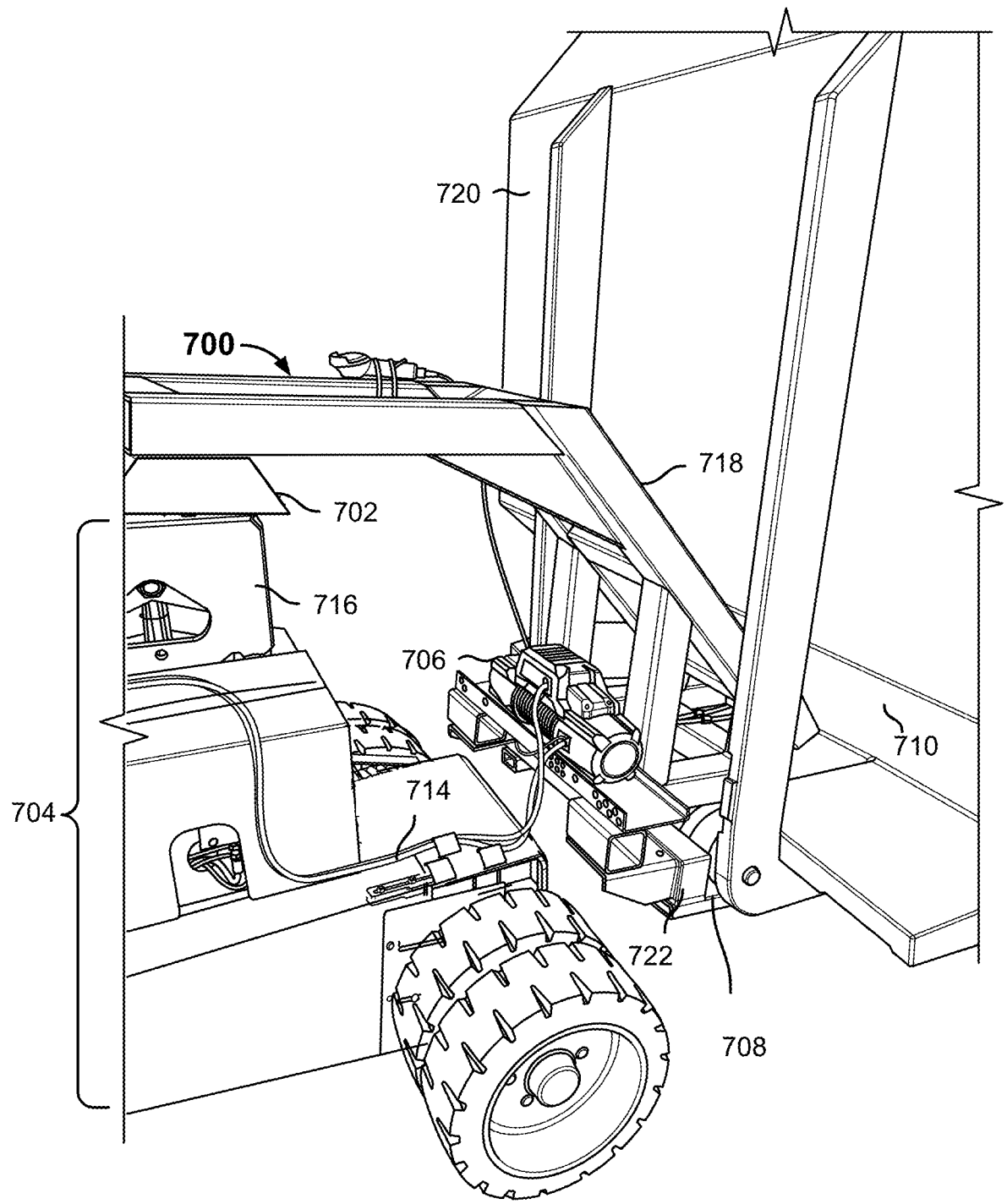
FIG. 7 is a diagram showing an example coupling of a container docking device to both a towing device and a container in accordance with some embodiments.

FIG. 7 is a diagram showing an example coupling of a container docking device to both a towing device and a container in accordance with some embodiments. As shown in FIG. 7, lengthwise structure 718 of container docking device 700 is angled in a way that conforms to the angle of section 710 of the shown front end of container 720. Container docking device 700 is tightened against container 720 via winch 706, which is part of container docking device 700 and that is hooked onto a hook (not visible in FIG. 7) of container 720. The two horizontal arms of support member 708 of container docking device 700 have also been slid underneath two respective guiding rollers of container 720. Given that the guiding rollers of container 720 butt up against vertical piece 722 of container docking device 700, they are locked into place and are prevented from rolling in a way that could cause container 720 to slip off container docking device 700 during the towing process. In the example of FIG. 7, winch 706 is an electric winch that is connected via wiring 714 to the battery of towing device 704. Container docking device 700 is coupled to towing device 704 by engaging with attachment 702 that is mounted to lifting unit 716 of towing device 704. For example, attachment 702 can be a gooseneck that engages with a corresponding coupler (not shown) that is secured to container docking device 700. In another example, attachment 702 can be a kingpin hitch that engages with a corresponding kingpin (not shown) that is secured to container docking device 700.

When lifting unit 716 is caused to be raised (e.g., using a motorized/hydraulic mechanism of towing device 704), the lifting force provided by lifting unit 716 is transmitted to container docking device 700, which in turn lifts the front end of container 720 off of the ground due to the tension attachment between container docking device 700 and container 720. Once the front end of container 720 is lifted off of the ground due to the raising of lifting unit 716 of towing device 704, container 720 can be rolled on its back wheels (not shown in FIG. 7) and towed/driven by towing device 704 to a new location. The tension attachment between container docking device 700 and container 720 (due to the pulling action of winch 706 and the conforming angle of lengthwise structure 718 of container docking device 700) provides a stable connection and ensures that towing device 704 can lift the front end of container 720 upwards, even when container 720 weighs up to thousands of pounds. Support member 708, comprising at least two horizontal arms, also provides multiple points of support of container 720 by container docking device 700 and therefore facilitates better weight distribution over container docking device 700 than if there were only a single point of support/contact/engagement.

Figure 8:
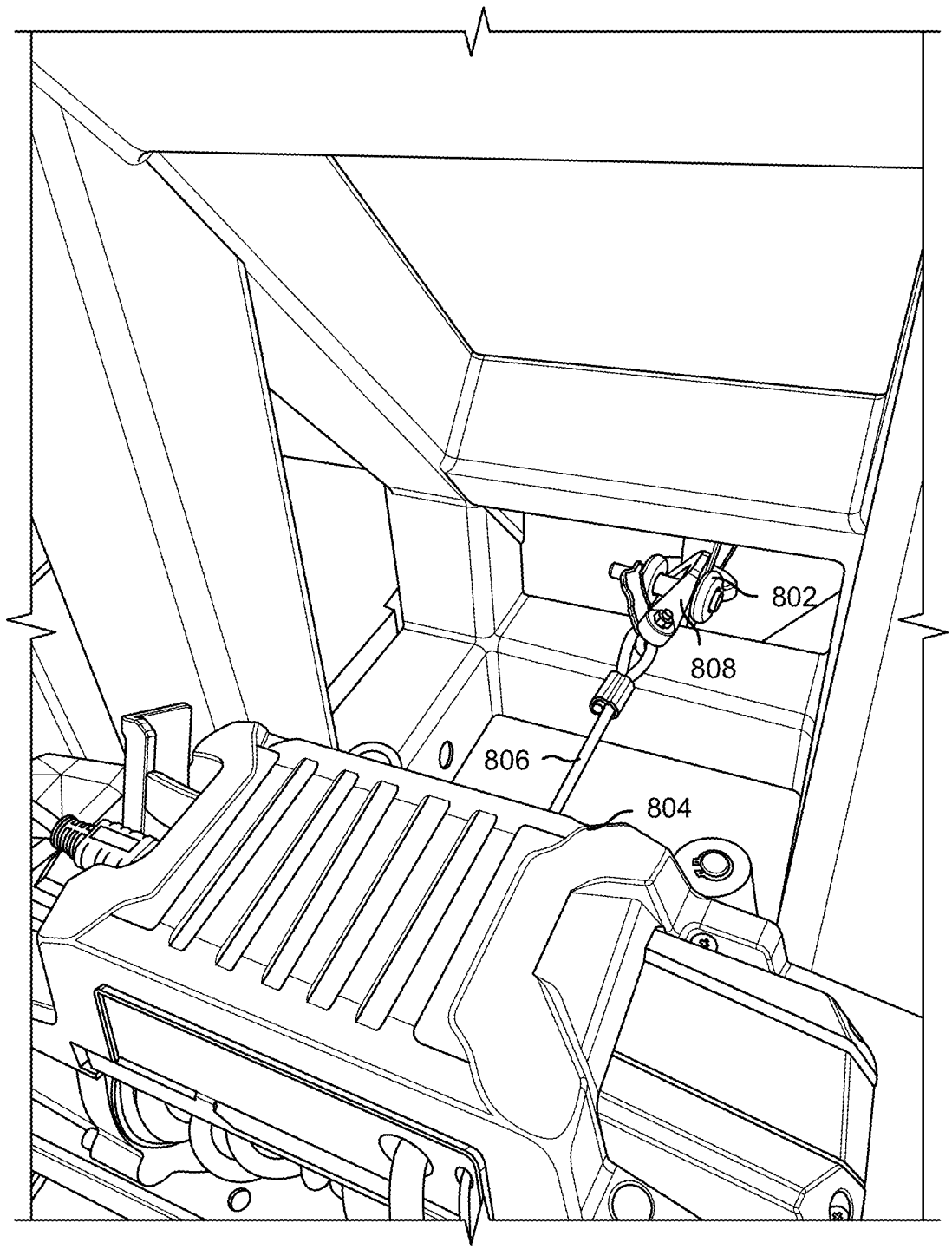
FIG. 8 is a diagram showing a close-up view of an example connection between a container docking device and a container in accordance with some embodiments.

FIG. 8 is a diagram showing a close-up view of an example connection between a container docking device and a container in accordance with some embodiments. For example, FIG. 8 shows an example connection between container docking device 700 of FIG. 7 and container 720 of FIG. 7. As shown in FIG. 8, hook 808 at the end of cable 806 of winch 804, which is connected to a container docking device, is engaged to hook 802 of the front end of a container. Cable 806 is pulled taut by winch 804 such that the lengthwise structure of the container docking device is substantially flush against the front end of the container, thereby creating a tight connection between the container docking device and the container.

Figure 9:
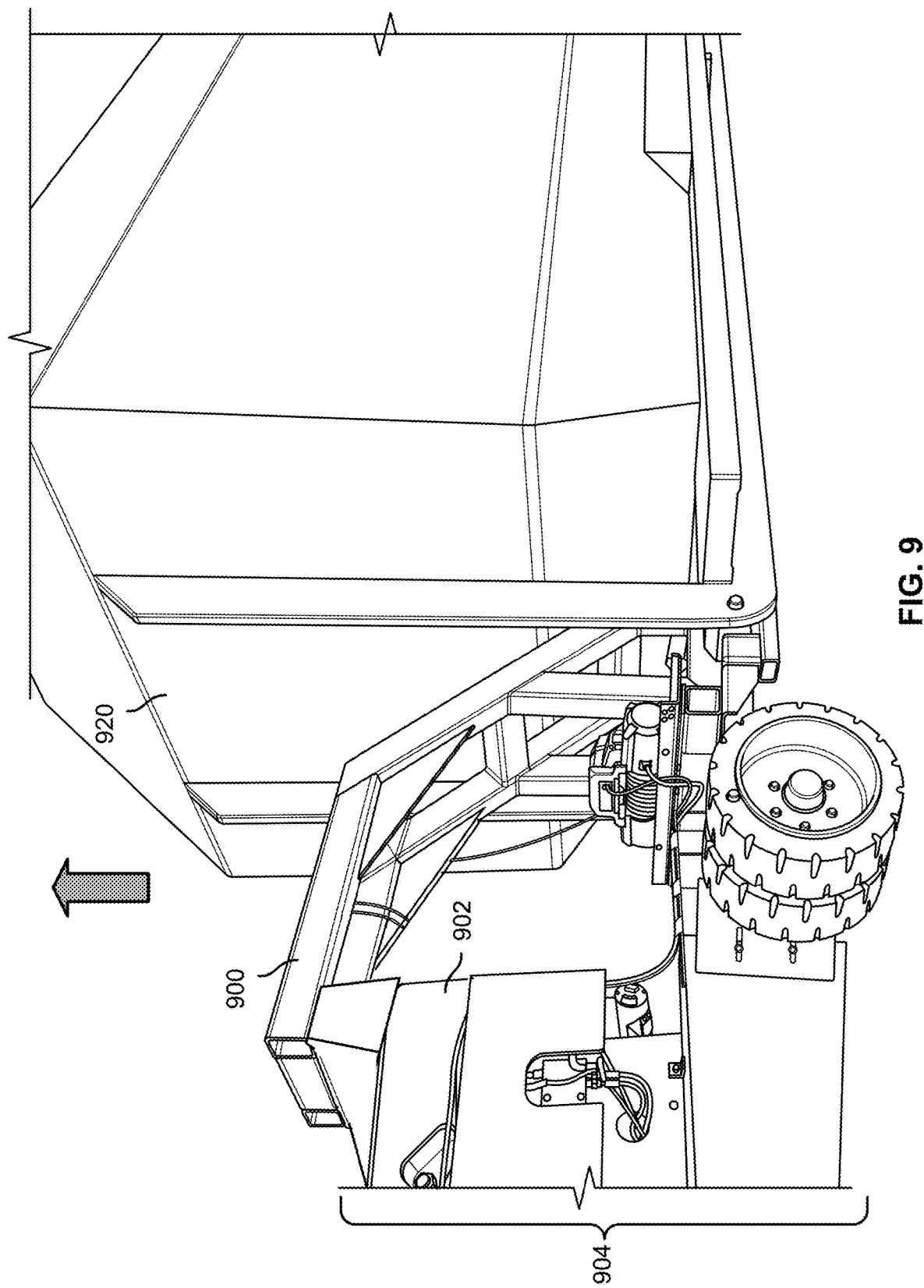
FIG. 9 is a diagram showing an example of the end of container that is connected to a container docking device being lifted upwards by the lifting unit of a towing device via a container docking device that is attached to both the container and the towing device.

FIG. 9 is a diagram showing an example of the end of container that is connected to a container docking device being lifted upwards by the lifting unit of a towing device via a container docking device that is attached to both the container and the towing device. The setup of a container docking device being connected on one side to the container and the other side to the towing device is similar to what is shown in FIG. 7. In FIG. 9, as lifting unit 902 of towing device 904 raises upwards (e.g., using a motorized/hydraulic mechanism), the lifting force lifts the container docking device, which in turn, lifts the front, connected end of container 920. Once the front, connected end of container 920 is lifted off the ground, towing device 904 can drive/tow/pull container 920 to a new location as container 920 travels on its back wheels (not shown).

Various embodiments of a container docking device that engages to both a towing device and a container are described herein. The tension mechanism of the container docking device that engages the container docking device to a standard, unmodified container provides a stable connection between the two. The support member of the container docking device that slides under a portion of the container channels a lift force from the towing device to one end of the container. The towing device connector of the container docking device provides a reliable attachment to the lifting unit of the towing device, while, in some embodiments, permitting for rotational movement about the point of engagement. The result of connecting the towing device to the standard, unmodified container via the container docking device is that a (e.g., single) operator of the towing device can maneuver or move the (e.g., large and heavy) container in a way in which the container stays reliably connected and is not damaged while in motion.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A container docking device, comprising:
a container connector comprising:
a tension mechanism that is configured to engage a container at an attachment point, wherein a lengthwise structure of the container connector conforms to a first end portion of the container to produce a snug fit of the first end portion of the container against the lengthwise structure of the container connector; and
a support member that is configured to engage a bottom portion of the container to lift the container; and
a towing device connector that is configured to engage a lifting unit of a towing device such that lifting force from the lifting unit is transmissible to the support member to lift the first end portion of the container off of a ground, and wherein a second end portion of the container includes wheels that are configured to roll and facilitate movement of the container.

2. The container docking device of claim 1, wherein the tension mechanism comprises a winch and wherein a cable associated with the winch is engaged with the attachment point.

3. The container docking device of claim 2, wherein the attachment point comprises a hook.

4. The container docking device of claim 1, wherein the tension mechanism comprises a chain that is engaged with the attachment point.

5. The container docking device of claim 1, wherein the tension mechanism comprises a come along that is engaged with the attachment point.

6. The container docking device of claim 1, wherein the lengthwise structure of the container connector conforms to the first end portion of the container by being at substantially the same angle relative to the support member as an angle of the first end portion of the container relative to the bottom portion of the container, and wherein the lengthwise structure of the container connector is substantially flush against the first end portion of the container.

7. The container docking device of claim 6, wherein the angle of the first end portion of the container relative to the bottom portion of the container is greater than 90° but less than 180°.

8. The container docking device of claim 6, wherein the angle of the first end portion of the container relative to the bottom portion of the container is approximately 90°.

9. The container docking device of claim 1, wherein an angle of the lengthwise structure of the container connector that conforms to the first end portion of the container relative to the bottom portion of the container is adjustable.

10. The container docking device of claim 1, wherein the support member comprises two horizontal arms.

11. The container docking device of claim 10, wherein a distance between the two horizontal arms is adjustable.

12. The container docking device of claim 1, wherein the support member slides under guiding rollers of the container.

13. The container docking device of claim 12, wherein the guiding rollers of the container are locked in place against the container connector.

14. The container docking device of claim 1, wherein the towing device connector comprises a kingpin that is coupled to an engagement point that is mounted to the lifting unit of the towing device.

15. The container docking device of claim 1, wherein the towing device connector comprises a ball connector that is coupled to an engagement point that is mounted to the lifting unit of the towing device.

\* \* \* \* \*